(12) United States Patent  
Shreve

(10) Patent No.: US 8,857,328 B1  
(45) Date of Patent: Oct. 14, 2014

(54) HIGH PRESSURE PRESS AND METHOD OF MAKING THE SAME

(75) Inventor: Shelby M. Shreve, Springville, UT (US)

(73) Assignee: US Synthetic Corporation, Orem, UT (US)

( * ) Notice: Subject to any disclaimer, the term of this patent is extended or adjusted under 35 U.S.C. 154(b) by 838 days.

(21) Appl. No.: 12/916,130

(22) Filed: Oct. 29, 2010

Related U.S. Application Data

(60) Provisional application No. 61/256,209, filed on Oct. 29, 2009, provisional application No. 61/256,219, filed on Oct. 29, 2009, provisional application No. 61/256,248, filed on Oct. 29, 2009, provisional application No. 61/256,267, filed on Oct. 29, 2009.

(51) Int. Cl.
*B29C 43/32* (2006.01)
*B30B 11/00* (2006.01)

(52) U.S. Cl.
USPC ....... 100/232; 425/77; 425/330; 425/DIG. 26

(58) Field of Classification Search
USPC .......... 100/214, 232, 269.01, 269.18; 425/77, 425/78, 193, 330, 405.2, DIG. 26; 419/48, 419/51
See application file for complete search history.

(56) References Cited

U.S. PATENT DOCUMENTS

| 2,389,818 A | 11/1945 | Rode et al. |
|---|---|---|
| 2,790,204 A | 4/1957 | Edwards et al. |
| 2,918,699 A | 12/1959 | Hall |
| 2,941,248 A | 6/1960 | Hall |
| 2,968,837 A | 1/1961 | Zeitlin et al. |
| 3,093,862 A | 6/1963 | Gerard et al. |
| 3,093,863 A | 6/1963 | Ehlert |
| 3,159,876 A | 12/1964 | Hall |
| 3,160,089 A | 12/1964 | Platou |
| 3,182,353 A | 5/1965 | Hall |
| 3,255,490 A | 6/1966 | Sturm |
| 3,257,688 A | 6/1966 | Levey, Jr. |
| 3,440,687 A * | 4/1969 | Hall ............................... 425/77 |
| 3,783,774 A | 1/1974 | Groos et al. |
| 3,914,078 A | 10/1975 | Kendall |
| 3,922,127 A | 11/1975 | Schwarzkopf |
| 4,302,168 A | 11/1981 | Khvostantsev |
| 4,927,345 A | 5/1990 | Takei et al. |
| 5,364,253 A | 11/1994 | Kojima et al. |
| 5,744,170 A | 4/1998 | Hall |
| 5,780,139 A | 7/1998 | Carter et al. |
| 5,851,568 A | 12/1998 | Huang |
| 6,022,206 A | 2/2000 | McNutt |

(Continued)

FOREIGN PATENT DOCUMENTS

CN 2291198 Y 9/1998

*Primary Examiner* — Jimmy T Nguyen
(74) *Attorney, Agent, or Firm* — Holland & Hart LLP

(57) ABSTRACT

Various embodiments of high pressure presses and related methods of manufacturing and operating such presses are described. In one embodiment, a cubic press is described having press bases with spacers disposed between adjacent press bases. Sets of two or more tie bars are also disposed between adjacent press bases. The tie bars are placed in a state of compression while the spacers are placed in a state of compression. During operation, the press bases may become displaced relative to one another such that additional tension is experience by the tie bars while the amount of compression experienced by the spacer is reduced. The tie bars exhibit a relatively small cross-sectional area as compared to the cross-sectional area of the spacer.

13 Claims, 11 Drawing Sheets

(56) References Cited

U.S. PATENT DOCUMENTS

| | | |
|---|---|---|
| 6,186,763 B1 | 2/2001 | Scanlan |
| 6,336,801 B1 | 1/2002 | Fish et al. |
| 6,336,802 B1 | 1/2002 | Hall |
| 7,186,104 B2 | 3/2007 | Hall et al. |
| 7,231,766 B2 | 6/2007 | Hall et al. |
| 7,354,262 B2 | 4/2008 | Hall et al. |
| 7,467,936 B2 | 12/2008 | Hall et al. |
| 7,467,937 B1 | 12/2008 | Hall et al. |
| 7,481,639 B2 | 1/2009 | Hall et al. |
| 7,497,675 B2 | 3/2009 | Hall et al. |
| 7,513,764 B1 | 4/2009 | Hall et al. |
| 7,517,203 B1 | 4/2009 | Hall et al. |
| 7,540,075 B2 | 6/2009 | Sung |
| 7,540,732 B1 | 6/2009 | Hall et al. |
| 7,569,249 B2 | 8/2009 | Hall et al. |
| 7,607,876 B2 | 10/2009 | Hall et al. |
| 7,819,648 B2 | 10/2010 | Yang et al. |

* cited by examiner

US 8,857,328 B1

HIGH PRESSURE PRESS AND METHOD OF MAKING THE SAME

CROSS-REFERENCE TO RELATED APPLICATIONS

The present application claims the benefit of each of U.S. Provisional Patent Application No. 61/256,209 filed Oct. 29, 2009, U.S. Provisional Patent Application No. 61/256,219 filed Oct. 29, 2009, U.S. Provisional Patent Application No. 61/256,248 filed Oct. 29, 2009 and U.S. Provisional Patent Application No. 61/256,267 filed Oct. 29, 2009, the disclosures of each which are incorporated by reference herein in their entireties.

BACKGROUND

High pressure presses have been used for decades in the manufacture of synthetic diamond. Such presses are capable of exerting a high pressure and high temperature on a volume of carbonaceous material to create conditions for sintering polycrystalline diamond. Known designs for high pressure presses include, but are not limited to, the belt press, the tetrahedral press, and the cubic press.

FIG. 1 shows a basic design for a conventional cubic press 10 known in the art.

The design generally includes six press bases 12, with each press base 12 facing towards a common central point 14. The press bases 12 have a generally conical shape, with an outer surface 16 and an inner surface 18. The inner surface 18 houses a piston 20, which is capable of being displaced towards the central point 14.

FIG. 2 shows a close-up view of components surrounding the central point 14 of the cubic press 10. Guide pins 22 help to keep the pistons 20 aligned as they move in and out. Tooling 24 is coupled to each of pistons 20 and may include a square-shaped surface 26 aligned perpendicularly to the axis of motion of the piston 20. The square-shaped surfaces 26 of the tooling 24 converge upon a defined cube-shaped volume. This volume may be occupied with a cube-shaped reaction cell upon which the square shaped surfaces 26 apply pressure and heat to create the conditions necessary to form synthetic diamond.

In ideal operation, the cubic press 10 operates by applying force in equal amounts and directions to all six sides of the cubic volume. However, even relatively minor imbalances in the amount or direction of force applied to any one side of the cubic volume can lead to the cubic press not operating properly and may damage components of the cubic press.

Referring back to FIG. 1, one known design of a cubic press 10 is shown. The press includes a plurality of tie bars 28 that may generally comprise large diameter bolts having a capped end and a threaded end. For example, in one embodiment, the bolts may exhibit a diameter of approximately nine (9) inches. The tie bars 28 are positioned so as to extend between each pair of adjacent press bases 12. Pockets are formed through the press bases 12 for receiving the tie bars 28. The threaded end of a tie bar 28 is passed through a pocket in a first press base and a pocket in a second press base adjacent to the first press base such that the capped end abuts or is flush with a surface of the first press base. A nut is screwed on the threaded end of the tie bar 28 and tightened against the second press base thereby placing the tie bar 28 in tension between pairs of adjacent press bases 12. The cumulative effect of tie bars 28 being positioned between each pair of adjacent press bases is the formation of a tie bar frame that attempts to provide stability to the cubic press 10 and help counteract any unequal distribution of force and the associated stress this may otherwise place on the high pressure press.

As also shown in FIG. 1, conventional cubic presses may include a spacer 30 positioned between each pair of adjacent press bases 12. The spacer 30 may be configured as a quarter section of a hollow tube and may be used to help position the press bases 12 in the desired cubic configuration. That is to say, the spacers 30 may have a length approximately equal to the distance that the press bases 12 should be spaced apart from one another. While the tie bars 28 are placed in a tensile stress condition, the spacers 30 are placed under compression between pairs of adjacent press bases 12. It is noted that the spacers 30 also have a much smaller cross sectional area as compared to the cross sectional area of the tie bars 28 (as taken in a direction substantially perpendicular to their respective lengths). Additionally, the spacers 30 conventionally act to position the bases with respect to each other only when the press 10 is in a pressurized condition. This type of loading cycle is also detrimental to the fatigue life of the spacers and associated components.

However, due to design weaknesses in, for example, load cycling and alignment of the press bases 12, tie bars 28 and spacers 30 of the above-described configuration, high cyclical bending stresses are often induced, for example, in the threads of the tie bars 28 and the hydraulic cavities of the press bases 12 leading to a significant reduction in the fatigue life of the cubic press components.

For example, the press bases in the above-described configuration may be more likely to fail after fewer cycles due to, for example, the machining out large diameter pockets in the press bases for receipt of the large diameter tie bars (i.e., the removal of a substantial amount of material from the press bases).

Further, with respect to alignment of the components of the cubic press, the above described configuration provides no means for helping to ensure proper alignment of the components.

In addition to potential issues pertaining to alignment and fatigue, the above configuration is also difficult to manufacture and assemble.

With respect to the manufacture of the above described cubic press, the components of the cubic press are each difficult and costly to produce. For example, the process of machining out large quantities of material from a press base to form a pocket for receiving a large diameter bolt, including achieving desired tolerances in such components, is an expensive and difficult manufacturing task.

Furthermore, manufacture and assembly of the above-described cubic press is often difficult and lacking in accuracy. For example, alignment and installation of the large diameter bolt within the pockets of the associated bases is a difficult and time consuming task. Likewise, applying the necessary and desired torque to tighten the large nut on a large diameter screw is a labor intensive, potentially dangerous, and inaccurate process.

Thus, it would be advantageous to provide an improved high pressure press configuration design and method of making the same.

SUMMARY

The present disclosure relates generally to high pressure presses and methods of making the same. In one embodiment, the disclosure relates to high pressure presses including a spacer and a plurality of tie bars extending between each pair of adjacent press bases of the high pressure press.

In accordance with one embodiment, a high pressure press is provided which comprises two or more press bases including pistons that are displaceable towards a common central point. A first spacer extends between a first press base and a second, adjacent press base of the two or more press bases. A first set of two or more tie bars extends between the first press base and the second press base with the tie bars being arranged about the periphery of an associated spacer. In one particular embodiment, the spacer may be in a state of compression while each of the tie bars of the first set may be in a state of tension.

In accordance with another embodiment of the present invention, a method of manufacturing a high pressure press is provided. The method includes abutting a first end of a spacer with a surface of a first press base and abutting a second press base with a second end of the spacer. A first set of two or more tie bars is positioned between the first press base and the second press base by inserting each tie bar of the first set through an associated tie bar pocket of the first press base and an associated tie bar pocket of the second press base. Each tie bar of the first set is tensioned.

In accordance with another embodiment of the present invention, a method of operating a high pressure press is provided. The method includes configuring a plurality of press bases such that a piston of each press base may be displaced towards a common region. At least one spacer between a first press base and a second press base of the plurality of press bases and the at least one spacer is placed in a state of compression when the high pressure press is in a state of rest. A plurality of tie bars is coupled to each of the first press base and the second press base and the plurality of tie bars is placed in a first state of tension while the high pressure press is in a state of rest. Each piston is displaced towards a common region and applies force to an object at or near the common region. The tie bars are placed in a second state of tension, greater than the first state of tension, while the pistons are applying force to the object.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

Figure 1:
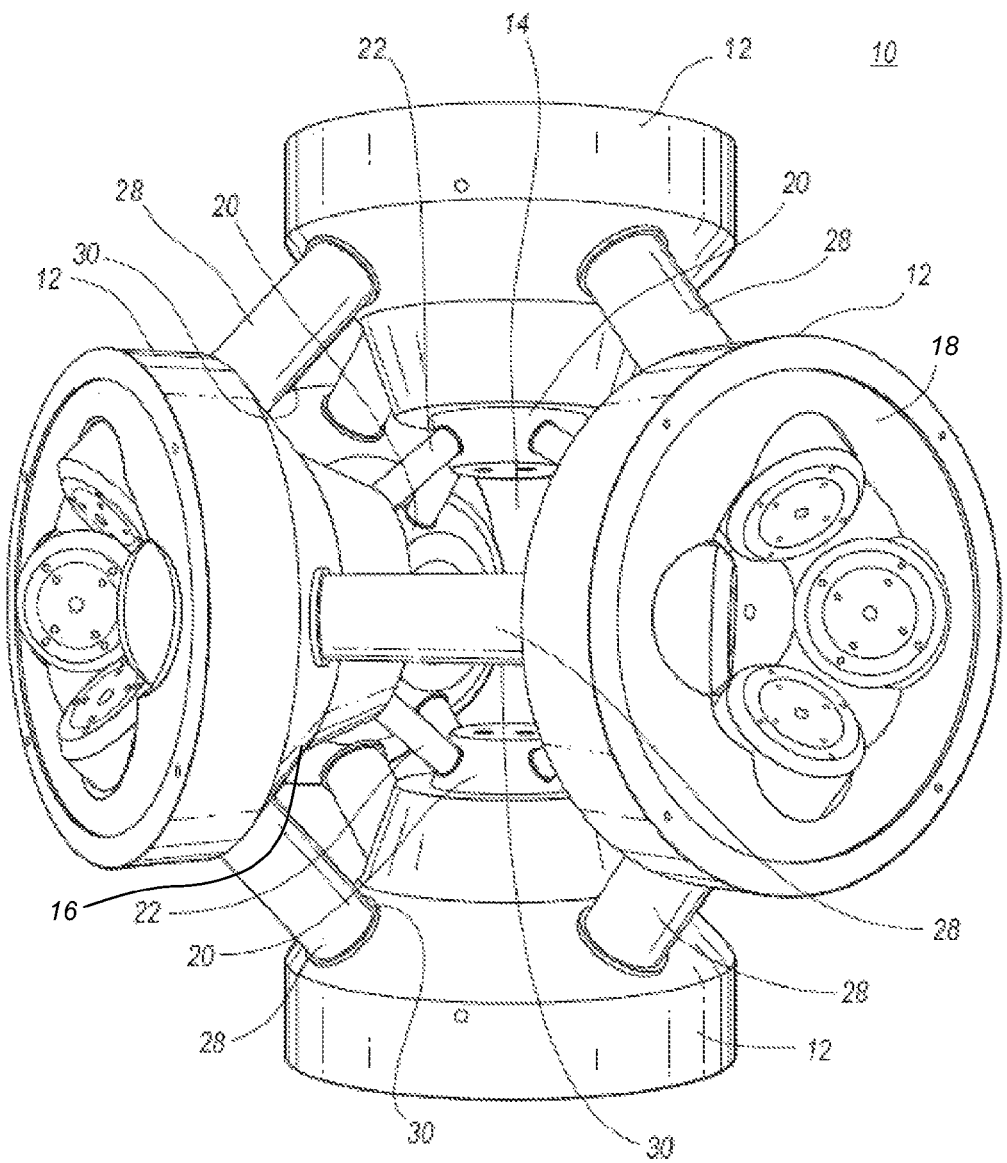
FIG. 1 shows a perspective view of a conventional cubic press known in the art.
Figure 2:
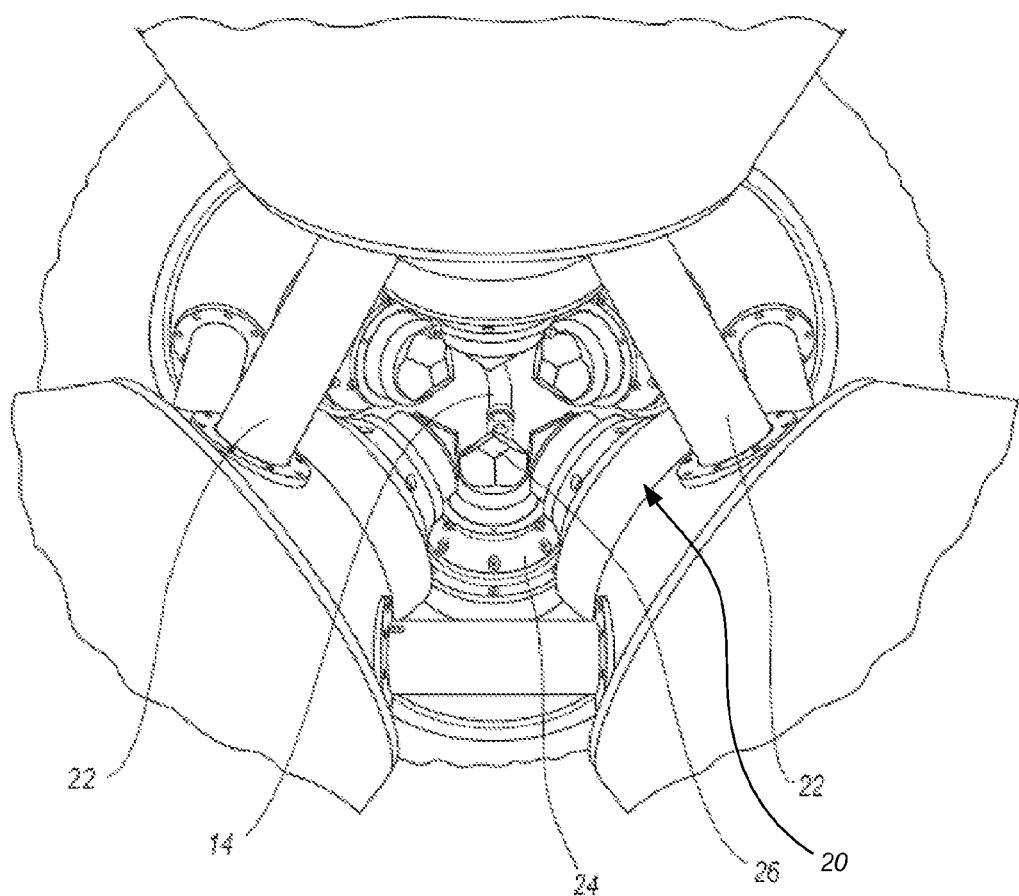
FIG. 2 shows a perspective view of a center point of the press shown in FIG. 1.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the embodiments described herein are not intended to be limited to the particular forms disclosed. Rather, the instant disclosure covers all modifications, equivalents, and alternatives falling within the scope of the appended claims.

DETAILED DESCRIPTION

The instant disclosure relates generally to high pressure presses and methods of making high pressure presses. In one embodiment, a high pressure press may include a spacer and plurality of tie bars positioned between each pair of adjacent press bases of the high pressure press. In one embodiment, the plurality of tie bars may surround the periphery of the spacer. Furthermore, each tie bar may be in tension while the spacer may be in compression. Such a configuration provides a high pressure press having improved alignment of the bases, while also making the high pressure press easier to manufacture, assemble and repair.

For purposes of explaining the features of the high pressure presses disclosed herein, a cubic high pressure press will be described and illustrated. However, the high pressure presses disclosed herein are not limited to a cubic configuration. For example, the features of the high pressure presses disclosed herein may also be used in a tetrahedral press.

Figure 3:
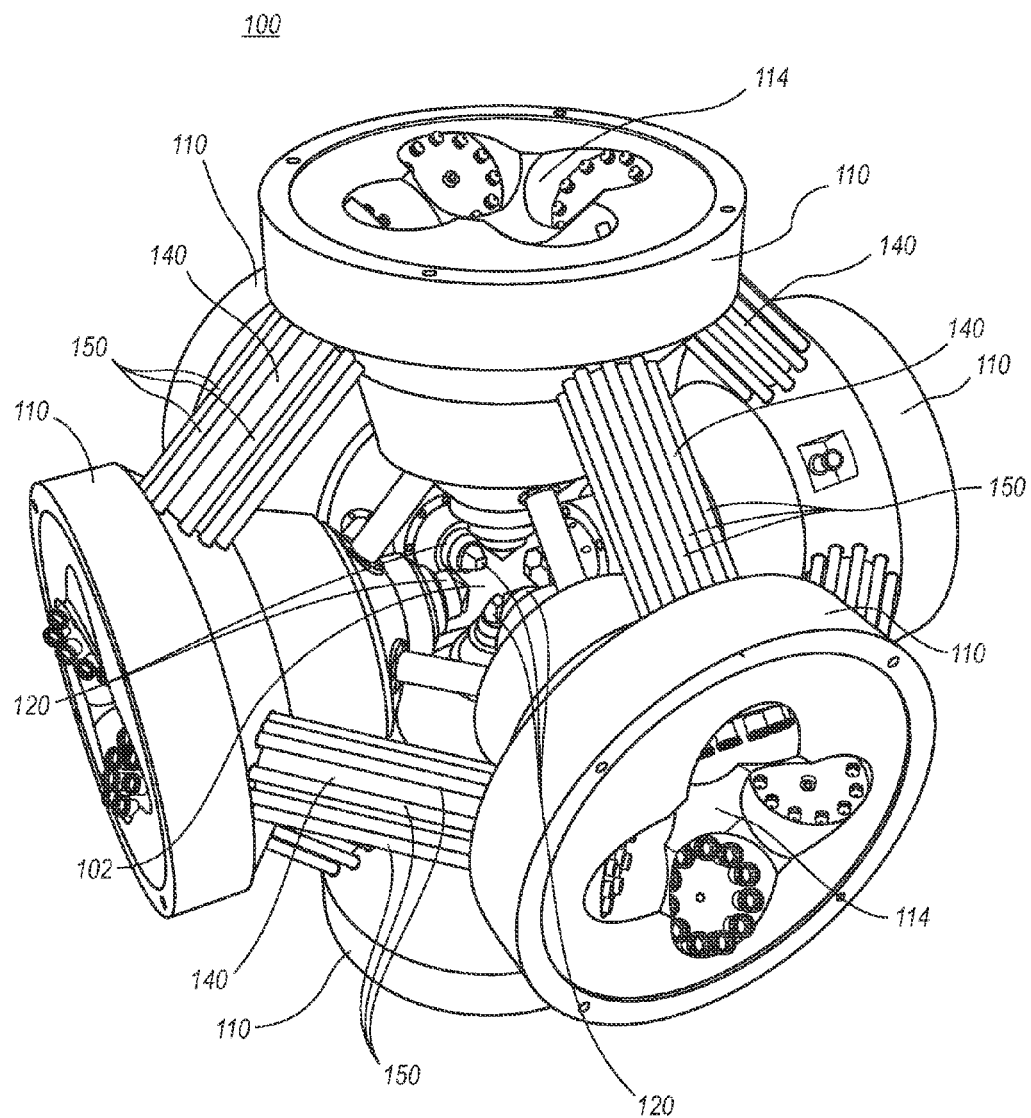
FIG. 3 shows a perspective view of a high pressure press according to an embodiment of the instant disclosure.
Figure 4:
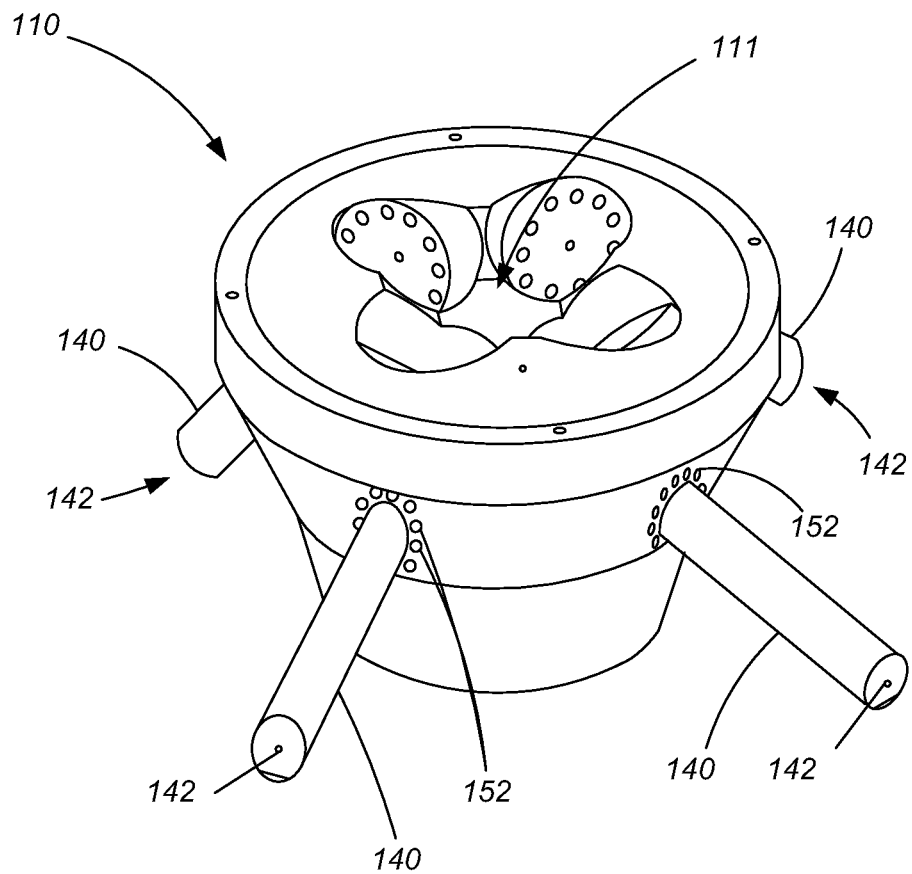
FIG. 4 shows a perspective view of a press base of the high pressure press illustrated in FIG. 3 having spacers secured thereto.
Figure 5:
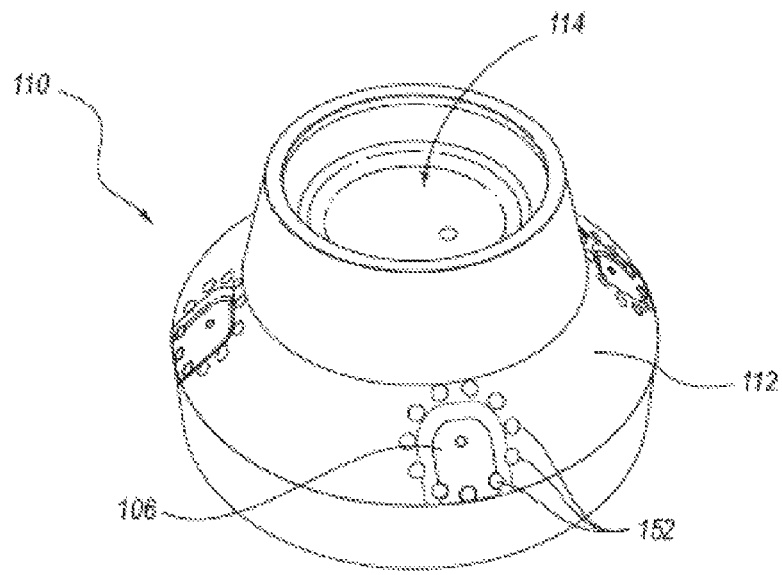
FIG. 5 shows a perspective view of a press base of the high pressure press illustrated in FIG. 3.
Figure 6:
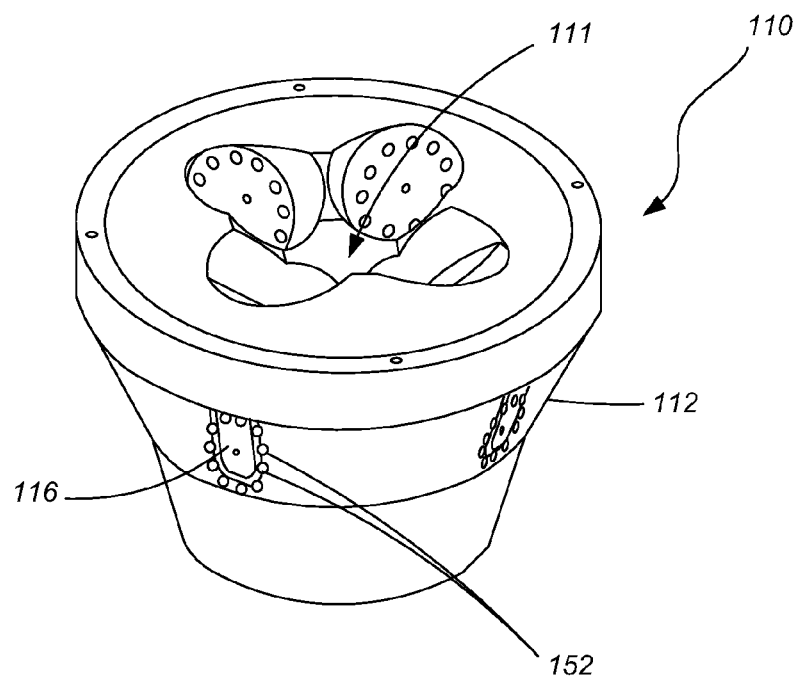
FIG. 6 shows a perspective view of a press base of the high pressure press illustrated in FIG. 3.

As shown in FIG. 3, a high pressure press 100 comprises six press bases 110 configured in a cubic orientation. By cubic orientation it is meant that each press base 110 is positioned so that its central axis points at, and is perpendicular to, a different face of a cubic reaction cell located about a central region 102 of high pressure press 100 during operation. High pressure press 100 also comprises six pistons 120, which may each be housed in a piston cavity 114 of an associated press base 110. While not labeled or viewable in FIG. 3, piston cavity 114 is shown in FIGS. 4, 5 and 6. Pistons 120 may move in and out of press base 110 towards and away from central region 102 of high pressure press 100. Outward movement of piston 120 towards the central region 102 may be accomplished by any suitable mechanism for moving a piston. In one example, the introduction of hydraulic fluid into the bottom (or some other portion) of piston cavity 114 in press base 110 forces piston 120 to move out of piston cavity 114 and towards central region 102. Tooling may be included at the end of piston 120 closest to central region 102. The tooling may include, for example, a flat, square surface that is perpendicular to the axis of motion of piston 120 and which will press against a side of the cubic reaction cell located at central region 102 during operation of high pressure press 100.

When pistons 120 begin to move in towards central region 102 and apply pressure against the cubic reaction cell, it is desirable that high pressure press 100 apply pressure to all sides in equal or substantially equal amounts in order to, among other things, avoid or limit the introduction of stress in various components of high pressure press 100. Where pressure is not applied equally on all sides (or where pressure is equally applied, but asymmetric loading or stress is still experienced by the tie rods or bases), the negative effects of such an imbalance (which may include, for example, crack formation and propagation in components of the of press 100) may be mitigated or eliminated by adding support structures between press bases 110 as described in greater detail hereinbelow. The endurance limit, or the ability to handle the application of cyclic stress states without mechanical or material failure, of various components of the high pressure press 100 (e.g., the press bases 110) may be improved substantially by the implementation of the support structure described herein.

In the embodiment described with respect to FIG. 3, a support structure may include a spacer 140 extending between each pair of adjacent press bases 110 and a set of two or more tie bars 150 extending between each pair of adjacent press bases 110. In one embodiment, the spacer may include a structure that exhibits a relatively large diameter or cross-sectional area as compared to the diameter or cross-sectional area of an individual tie bar. For example, in one embodiment, a spacer 140 may exhibit a diameter of approximately 9 inches and the tie bars may exhibit a diameter of approximately 1.75 inches, although other sizes and size ratios are also contemplated. As shown in FIG. 3, tie bars 150 may be arranged about the periphery of spacer 140 (i.e., about the periphery of the spacer's cross-section as taken substantially perpendicular to a longitudinal axis of the spacer extending between associated, adjacent press bases 110). Tie bars 150 may be arranged about the periphery of spacer 140 such that tie bars 150 are evenly spaced about the periphery of spacer 140, although other uneven or geometrically asymmetrical spacing arrangements may also be used. In one embodiment tie bars 150 may be positioned such that they abut or are contiguous with the spacer 140. In another embodiment, tie bars 150 may be set off from or spaced relative to the spacer 140 so that a gap exists between the sides of tie bars 150 and the side of spacer 140. Also, as shown in FIG. 3, tie bars 150 may be aligned to be substantially parallel with spacer 140 as they extend between adjacent press bases 110.

Spacers 140 and tie bars 150 may have any suitable shape for providing stability to high pressure press 100. As shown in FIG. 3, spacer 140 and tie bars 150 may exhibit substantially cylindrical shapes. In one embodiment, all of the tie bars 150 of a given high pressure press 100 may exhibit the same or similar geometry. Similarly, in one embodiment, all of the spacers 140 of a high pressure press 100 may exhibit the same or similar geometries, whether or not they be generally similar in shape or geometry to tie bars 140. In another embodiment, different spacers 140 of the same high pressure press 100 may exhibit different shapes, just as different tie bars 150 of the same high pressure press 100 may have different shapes. Furthermore, as indicated above, spacers 140 and tie bars 150 of the same high pressure press 150 may have the same shape or different shapes.

Referring now to FIGS. 4, 5 and 6, the manner of positioning tie bars 150 and spacer 140 between adjacent press bases 110 is described and illustrated.

With respect to spacer 140, the ends 142 of spacer 140 may be positioned to abut an outer side surface 112 of two adjacent press bases 110. Spacers 140 may be placed under compression as will be described in further detail below. The use of a spacer 140 placed in compression and having a relatively large cross-sectional area may provide a more reliable joint between associated press bases 110 than previously used designs that rely heavily on tensioned elements. Positioning spacers 140 by abutting them against outer side surface 112 of press bases 110 provides an advantage over previously known configurations. Particularly, the press bases 110 may be easier and less costly to manufacture.

Figure 7:
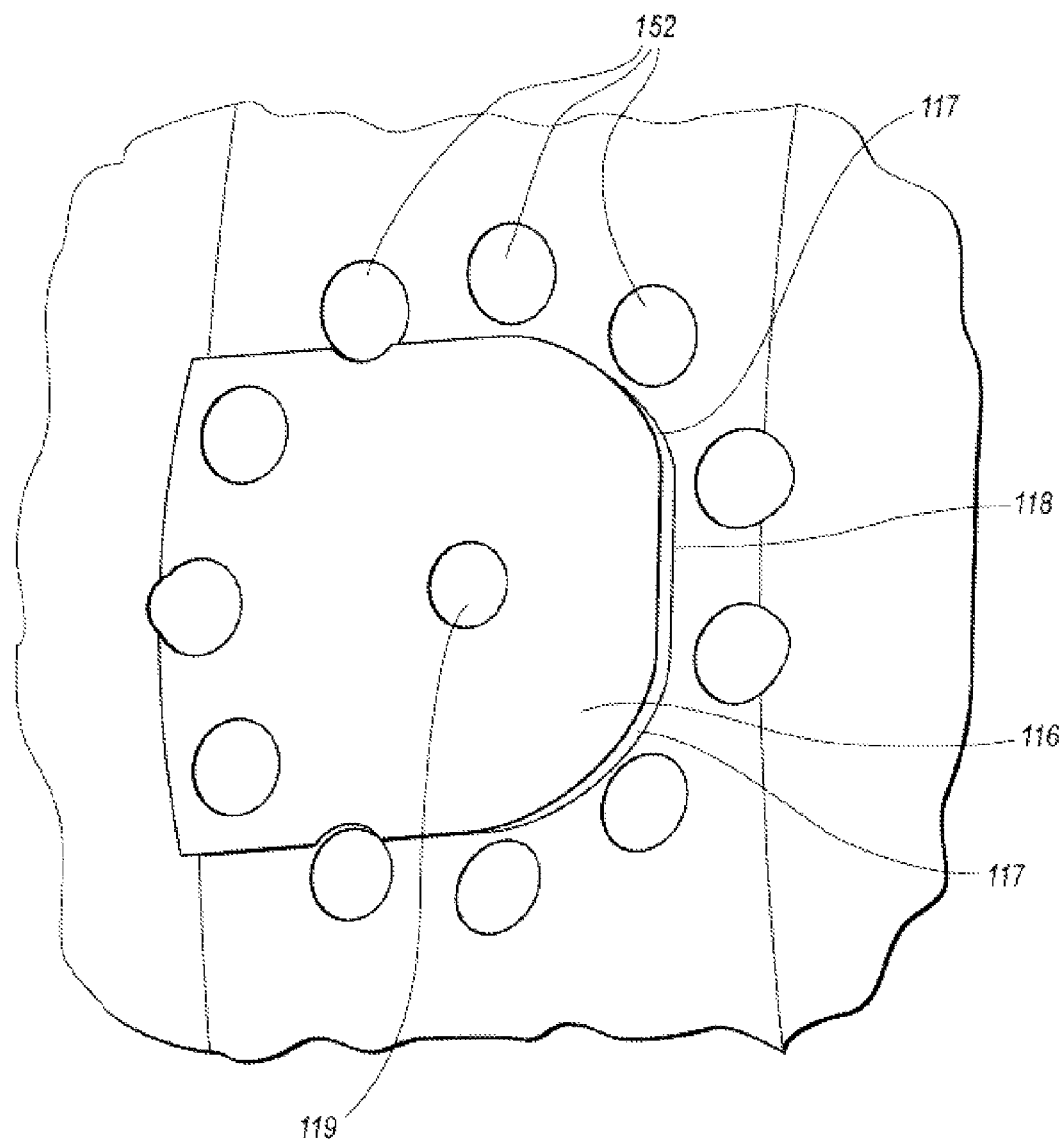
FIG. 7 shows a close-up perspective view of an outside side surface of a press base according to an embodiment of the instant disclosure.

Referring now to FIGS. 5 and 7, press base 110 may include a recessed or shouldered surface, referred to herein generally as an indent 116 (or indentation), on outer side surface 112 for receiving and aligning spacer 140. Indent 116 may have a shape approximate the cross-sectional shape of spacer 110 such that indent 116 receives and aligns spacer 140 when spacer 140 is positioned against press base 100. In one embodiment, as shown in FIG. 7, indent 116 may include rounded corners 117 to generally conform to the circular cross-section of spacer 140. Of course, as noted previously, the spacer may exhibit other cross-sectional geometries and, therefore, the indent may be configured to accommodate such.

Figure 8:
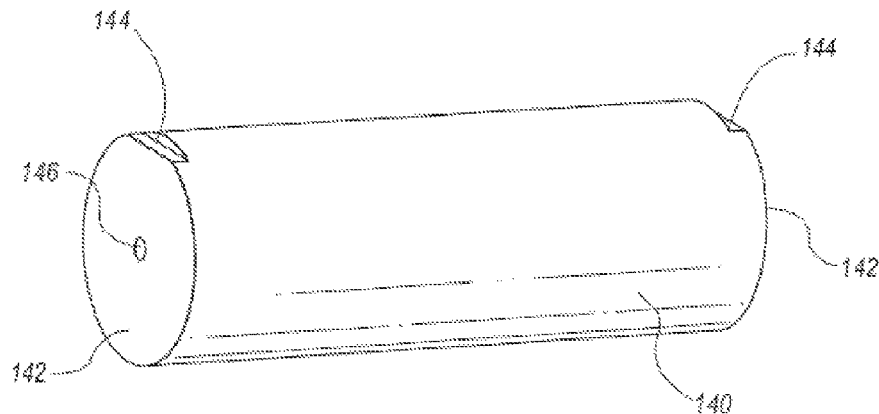
FIG. 8 shows a perspective view of a spacer according to an embodiment of the instant disclosure.

As also shown in FIG. 7, indent 116 may also include a straight wall portion 118 between rounded corners 117. Straight wall portion 118 may be used in conjunction with a notch 144 located at ends 142 of spacer 140, as shown in FIG. 8, to prevent spacer 140 from rotating within indent 116. For example, if indent 116 and spacer 140 are both circular (or if indent 116 is "oversized" compared to the cross-sectional geometry of the spacer 140), spacer 140 may freely rotate within indent 116. However, by implementing straight wall portion 118 and notch 144 with the spacer 140 being positioned such that the notch 144 engages the straight wall portion 118, spacer 140 will not be able to freely rotate in indent 116.

The above features of the disclosed embodiment may assist in assuring that high pressure press 100 is properly aligned. Indent 116 may be formed on outer side surface 112 of press base 110 with a desired level of accuracy and precision, thereby ensuring proper alignment of spacers 140. As mentioned briefly above, misalignment of press bases 110 of high pressure press 100 may be a factor in failure of components of high pressure presses and, therefore, the above features help to reduce the possibility of misalignment.

FIGS. 4, 7 and 8 also illustrate the securement of spacer 140 to side surface 112 of press base 110. FIG. 7 shows that an aperture or a first spacer securing pocket 119 may be formed through a portion of indent 116. First spacer securing pocket 119 may or may not pass all the way through press base 110. FIG. 8 shows that spacer 140 may likewise include an aperture or a second spacer securing pocket 146. First and second spacer securing pockets 119, 146 may be used in conjunction to secure spacer 140 to press base 110. For example, spacer 140 may be aligned in indent 116 such that first and second spacer securing pocket 119, 146 are aligned with one another. Then, where first spacer securing pocket 119 extends through press base 110, a bolt or some other alignment or securing mechanism may be inserted into first spacer securing pocket 119 from the opening opposite the opening in indent 116. The bolt or other aligning or securing mechanism may then pass through the opening in indent 116 and into second spacer securing pocket 146 of spacer 140. In one embodiment, second spacer securing pocket 146 may, e.g., include female threads to receive male threads of the bolt or other alignment or securing means to thereby allow spacer 140 to be coupled with press base 110. FIG. 4 illustrates the result of securing spacers 140 to press base 110 in accordance with one embodiment.

Unlike spacers 140 that may abut outer side surfaces 112 of press bases 110, the plurality of tie bars 150 positioned between adjacent press bases 110 extend into and through a portion of the press bases 110 and are then put under tension. As shown in FIGS. 5-7, tie bars 150 may extend through press bases 110 via holes or apertures in press bases 110, referred to as tie bar pockets 152 herein. Tie bar pockets 152 may extend through press bases 110 from outer side surface 112 of press bases 110 to a tie bar cavity 111 in press base 110 as illustrated in FIG. 6. Tie bar cavity 111 may be formed in a surface of press base 110 that is generally opposite the surface of press base 110 having piston cavity (not shown) formed therein. Tie bar cavity 111 in press base 110 may serve to provide a surface generally perpendicular to the axis of tie bars 150 as they pass through press bases 110. In this manner, a securing means, such as a nut or other fastener, may be tightened against the surface of the tie bar cavity 111 so as to tension tie bars 150 after they are in place between adjacent press bases. As shown in FIG. 6, tie bar cavity 111 may provide four such surfaces to accommodate tie bars 150 passing through press base 110 from four different directions (i.e., the surfaces lie in planes that are not parallel to one another). Tie bar cavity 111 of press base 110 may include more or fewer surfaces depending on the configuration of high pressure press 100.

The openings of tie bar pockets 152 at outer side surface 112 may be arranged about indent 116 such that when tie bars 150 and spacer 140 are positioned between adjacent press bases 110, tie bars 150 are arranged about the periphery of spacer 140 as discussed above. In one embodiment, and as noted previously, tie bar pockets 152 may have a shape approximately equal to the cross sectional shape of tie bars 150 in order to provide a close fit for tie bars 150. For example, where tie bars 150 are cylindrical, tie bar pockets 152 may have a circular shape with a diameter approximately equal to the outer diameter of tie bars 150, but large enough to accommodate passage of the tie bars 150 therethrough.

Tie bars and corresponding tie bar pockets 152 are relatively small in cross-sectional area as compared to associated spacers 140, and their installation through press bases 110 do not require that large amounts of material be removed from press bases 110. Accordingly, the overall strength of each press base 110 is generally maintained after tie bar pockets 152 are formed. A plurality of smaller tie bar pockets 152 is also easier and less expensive to manufacture in press base 110 than the large diameter spacer pockets used in previously known designs. Moreover, smaller tie bar pockets 152 may be formed with greater precision and accuracy (as compared to prior art designs), thereby improving the overall alignment of high pressure press 100.

Tie bars 150 may be any suitable structure for passing through adjacent press bases 110 and being placed under tension. In the embodiments illustrated, tie bars 150 may include bolts having a capped end, the cap being larger than openings of tie bar pockets 152, and a threaded end. The threaded end of tie bar 150 may be first inserted into an opening of a tie bar pocket 152 in tie bar cavity 111 of press base 110 and passed through press base 110 until the threaded end emanates from outer side surface 112 of press base 110. The threaded end may then be inserted into a corresponding opening of tie bar pocket 152 in outer side surface 112 of a press base 110 located adjacent the first press base 110 that tie bar 150 was passed through. The threaded end then emanates from tie bar pocket 152 in tie bar cavity 111 of the adjacent press base 110. At this point, the capped end of tie bar 150 may be flush against or otherwise abut the opening of tie bar pocket 152 in tie bar cavity 111 of the first press base 110 (of course, it is noted that washers or other similar components might be installed between the cap and the press base). A nut, or other appropriate fastening device may then be coupled with the threaded end of tie bar 150 and tightened so as to place the tie bar 150 in tension (again, it is noted that washers or other components might be installed between the nut and press base). In another embodiment, both ends if the tie bar 150 may be threaded and nuts or other threaded members may be coupled to each end of the tie bar 150.

By using relatively small cross-sectional area (e.g., small diameter) tie bars 150, the amount of tension experienced by each tie bar 150 may be closely and accurately controlled. For example, considering the above-described embodiment, the amount of torque applied to each nut of a given tie bar 150 is significantly more controllable than when larger nuts and tie bars are being used, and therefore the amount of tension applied to each tie bar 150 may be accurately controlled. However, the tie bars may also be placed in tension by other means. For example, in one embodiment, tie bars 150 may be hydraulically tensioned within +/−1% of a desired level of tension, as compared to previous designs which only allowed accuracy to within +/−10%. More accurate tensioning of tie bars 150 may lead to more overall stability of high pressure press 100 and less fatigue of such components.

The plurality of tensioned tie bars 150 act in conjunction with one another to distribute stress substantially equally amongst the plurality of tie bars 150 about the periphery of the space 140. In distributing stress in a generally uniform manner, any number of tie bars 150 greater than one may be used between each pair of adjacent press bases 110. A greater number of tie bars 150 allows for a greater distribution of stress, and correspondingly, either less stress per tie bar 150 or use of tie bars with smaller cross-sectional areas. However, space constraints may limit the number of tie bars 110 that can be used between a pair of adjacent press bases 110. In one example, eleven tie bars 150 may be positioned between each pair of adjacent press bases 110. Tie bars 150 may be spaced evenly around the periphery of spacer 140 or may be spaced apart from each other at uneven distances.

Referring back to FIG. 3, spacer 140 is illustrated as having a larger cross-sectional area than the cross-sectional area of each tie bar 150. A spacer 140 with a large cross-sectional area allows the cross-sectional area of tie bars 150 to be smaller without drastically influencing the reliability of the joint. Furthermore, tie bars 150 having a large length to diameter ratio are less sensitive to bending stresses in general, and therefore add to the overall stability of the joints.

Figure 9:
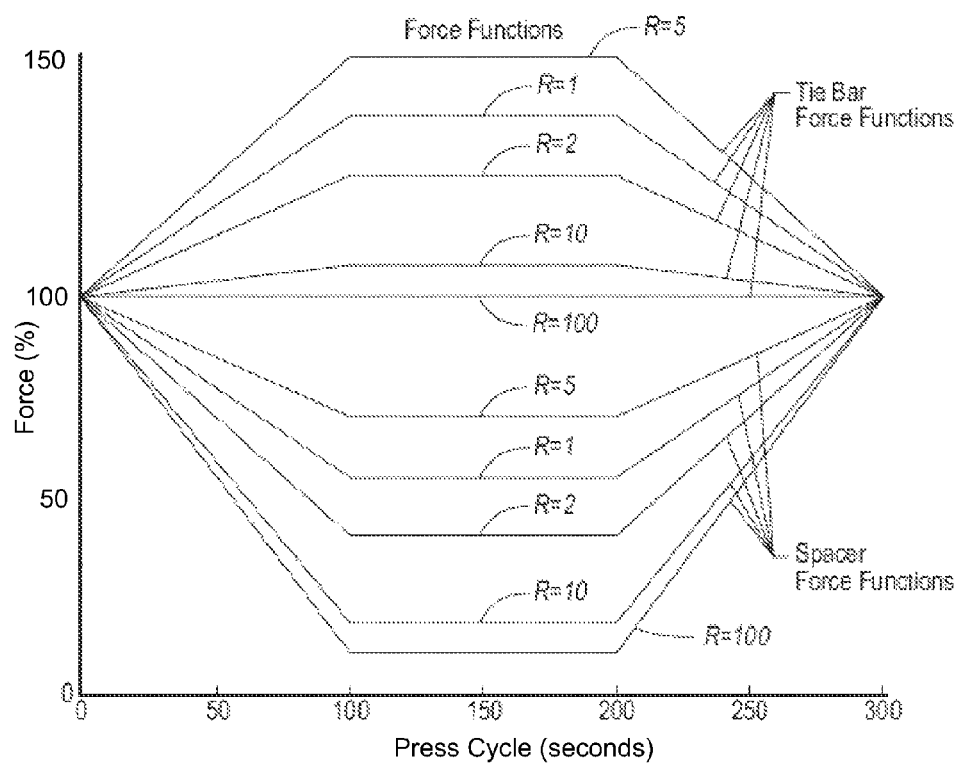
FIG. 9 is a graph showing the effect of the $A_S/A_T$ ratio on the stress carried by tie bars and the spacer during a press cycle of a high pressure press according to an embodiment of the instant disclosure.

The ratio of the cross-sectional area of spacer 140 ($A_S$) to the sum of the cross-sectional areas of tie bars 150 ($A_T$), the ratio being hereinafter referred to as $A_S/A_T$, has been found to be a value that impacts the effect of a press cycle on the joint between adjacent spacers, and correspondingly, the fatigue life of the components of high pressure press 100. In general terms, a higher $A_S/A_T$ value results in less force being applied to tie bars 150 over the course of a press cycle, and therefore likely prolongs the life of components of high pressure press 100 due to the application of less stress per cycle. FIG. 9 illustrates this concept. Multiple high pressure presses according to the disclosed embodiment, having varying $A_S/A_T$ ratios, were subjected to the same press cycle. The graph illustrates the load (or force) experienced by tie bars 150 during a press cycle and as well as the load (or force) experienced by a spacer 140 during a press cycle. The "Force" axis is normalized such that represents a magnitude of force applied to the specified components. When the $A_S/A_T$ ratio (indicated in FIG. 9 as R) was 0.5, the force applied to tie bars 150 (being pre-loaded in a tensile state) jumped from 100% (i.e., preload condition) to about 150% of preload condition during the press cycle, while the force applied to spacer 140 (being pre-loaded in a compressive state) dropped from 100% of preload condition to about 75% of preload condition. When the $A_S/A_T$ was increased to 10, the force applied to tie bars 150 changed only a relatively tiny amount during the press cycle, while the force applied to spacer 140 took a significant drop to less than 50% of preload condition. The only minor increase in force applied to tie bars 150 during the press cycle when the $A_S/A_T$ ratio was 10 will likely result in a longer overall life for the high pressure press, since tie bars 150 are not undergoing large amounts of stress every cycle that will tend to cause failure in high pressure press components.

Accordingly, high pressure press 100 may preferably have a $A_S/A_T$ greater than 0.5, more preferably a $A_S/A_T$ greater than 5.0, and most preferably a $A_S/A_T$ ratio greater than 10.

It is noted that the above-described embodiment may also be characterized as having a plurality of springs positioned between the press bases 110 and that the above ratio $A_S/A_T$ is derived from a stiffness ratio of the tie bars and spacer. Thus, the stiffness ratio, while described as being altered through manipulation of cross-sectional areas in the example above, may be also be manipulated in other ways, such as by altering the materials from which the components are made. Thus, tie bars 140 may be considered as a plurality of springs in tension with each exhibiting a relatively low spring constant (k). The spacer 140 may be considered as a spring in compression with a relatively large spring constant.

In one embodiment, when the press 100 is assembled, such as shown in FIG. 1, tie bars 150 may be placed in tension up to, for example, 95% of their elastic limit. On the other hand, the spacer 140 may be placed in compression at a level of, for example, less than approximately 5% of its elastic limit. During operation of the press 100 (i.e., when pistons 120 are actuated and applying pressure to a cubic reaction cell) press bases 110 may become slightly displaced relative to one another. Under conventional operating conditions, tie bars 150 will experience additional tension (although not typically exceeding their yield strength) while spacer 140 may see a reduction in the magnitude of compression, although it may not necessarily experience a zero load (or complete lack of compression loading). Such a configuration enhances the fatigue life of the press 100 including components such as press bases 110, spacers 140 and tie bars 150.

In addition to improved fatigue life, the above described embodiment provides a variety of other advantages. For example, repair work is easily facilitated with such a configuration. If a component were to fail, for example, due to overloading or fatigue, the above described embodiment is configured such that the most likely component to show failure would be the tie bars 150. Tie bars 150 are easily replaced as is apparent from the discussions above. Additionally, tie bars 150 are one of the less expensive and less difficult components of the press 100 to manufacture. Moreover, the above-described embodiment retains a relatively "open" configuration to provide ready access to the cubic reaction cell during intended operation of the press 100 as well as to provide access to the pistons 120 and related components for both routine and unexpected maintenance or repair.

In another embodiment of the instant disclosure, a method of manufacturing a high pressure press may include positioning a first end of one or more spacers at a first press base, positioning a second press base at a second end of at least one of the spacers, coupling two or more tie bars with each of the first press base and the second press base, and tensioning the two or more tie bars extending between the first press base and the second press base. Additionally, the method may include placing the spacer in a compressive stress state.

Figure 10:
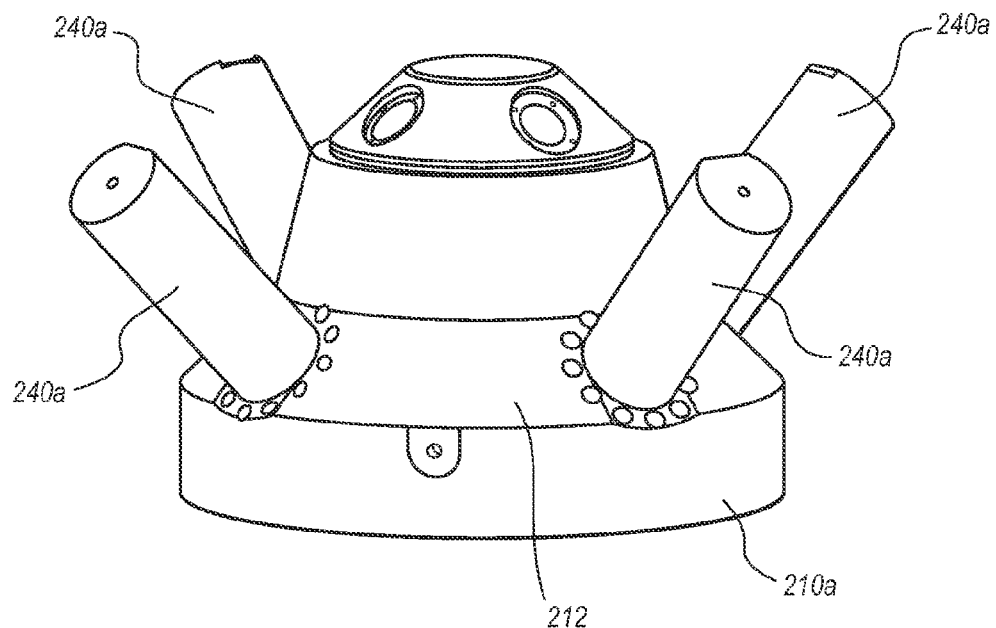
FIG. 10 shows a perspective view of a partially constructed high pressure press during a preliminary step of manufacturing a high pressure press according to an embodiment of the instant disclosure.

FIG. 10 illustrates a first act of the method. Press base 210a is illustrated as having first ends of one or more spacers 240a positioned at desired locations relative to the press base. In the embodiment shown in FIG. 10, four spacers 210a are positioned on press base 210a. However, the number of spacers 240a positioned on or about the press base 210a is not so limited. FIG. 10 also shows spacers 240a equally spaced about press base 210a, although spacers 240a need not be equally spaced.

As described previously, spacers 240 may be positioned relative to press base 210a by having a first end of spacer 240a abut outside side surface 212 of press base 210a. Alignment of spacer 240a on press base 210a may be guided by an indentation, recess or shouldered surface in outside side surface 212 of press base 210a as described in greater detail previously. Furthermore, to hold spacer 240a in position on outside side surface 212 of press base 210a, spacer 240a and press base 210a may include spacer securing pockets. A spacer securing pocket in spacer 240a may be aligned with a spacer securing pocket in press base 210a, followed by inserting an alignment structure or a securing structure or mechanism into both spacer securing pockets as described in greater detail above.

Figure 11:
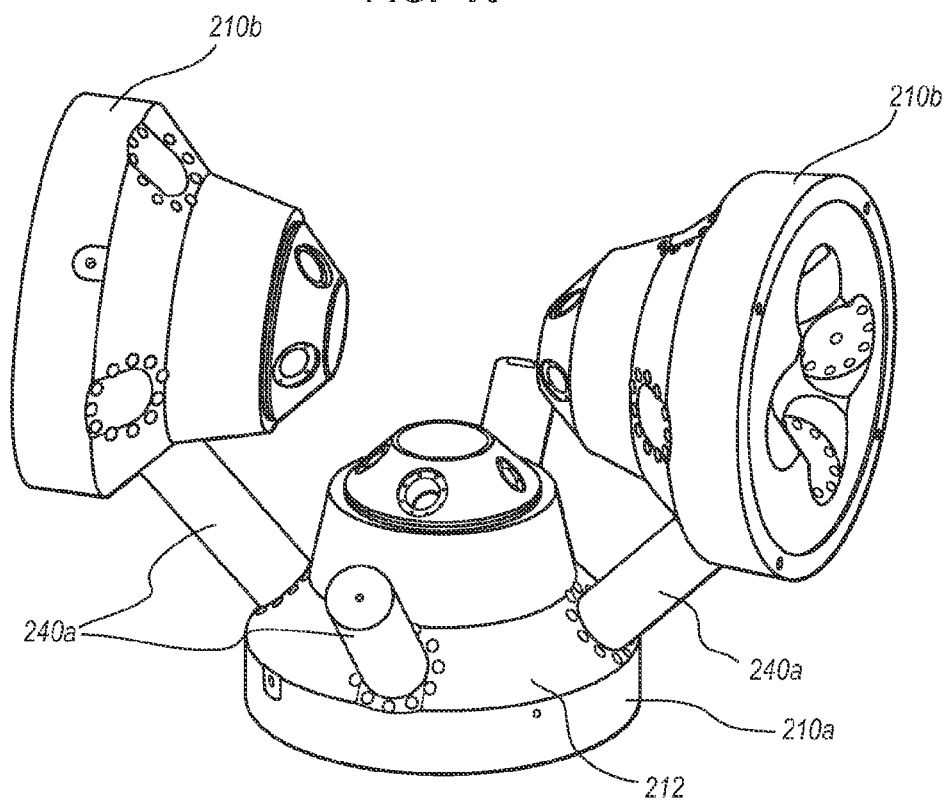
FIG. 11 shows a perspective view of a partially constructed high pressure press during an intermediate step of manufacturing a high pressure press according to an embodiment of the instant disclosure.

Following positioning of spacers 240a on press base 210a, additional press bases 210b may be positioned relative to a second end of at least one of spacers 240a. As shown in FIG. 11, additional press bases 210b are positioned on two of spacers 240a. As with press base 210a, press bases 210b may be aligned with spacers 240a via indentations, recesses or shouldered surfaces located on outside side surfaces of press bases 210b. Additionally, press bases 210b may be secured to spacers 240a by aligning spacer securing pockets in each component and extending a securing structure or mechanism, such as a bolt, into both press bases 210b and spacers 240a.

Figure 12:
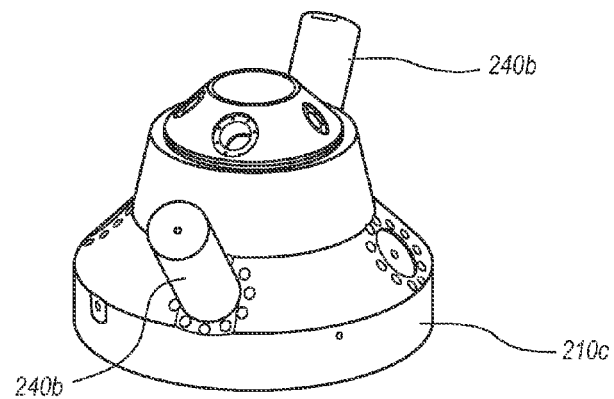
FIG. 12 shows a perspective view of a press base that may be added to a partially constructed high pressure press during a step of manufacturing a high pressure press according an embodiment of the instant disclosure.
Figure 13:
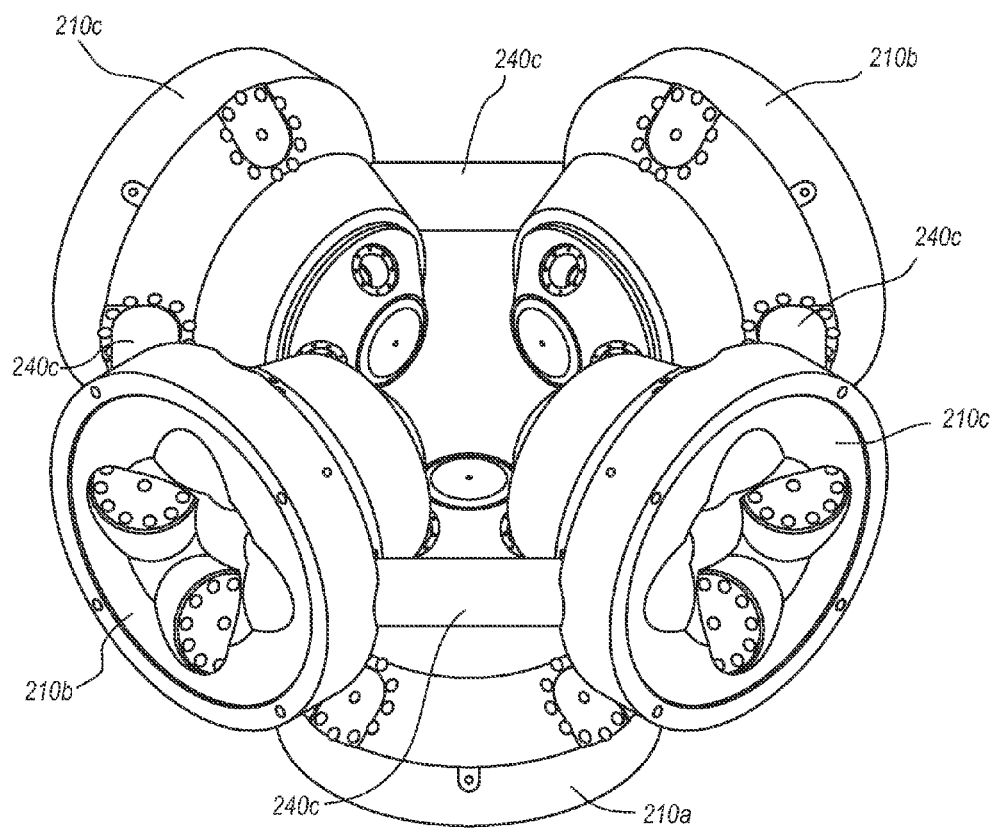
FIG. 13 shows a perspective view of a partially constructed high pressure press during an intermediate step of manufacturing a high pressure press according to an embodiment of the instant disclosure.

Press bases 210b as shown in FIG. 11 only have spacers 240a positioned relative thereto. However, as shown in FIG. 12, press bases 210c may have spacers 240c positioned thereon prior to being positioned on spacers 240a. For example, after positioning press bases 210b relative to spacers 240a, press bases 210c as shown in FIG. 12 may then be positioned relative to press bases 210b and 210a. The result is illustrated in FIG. 13, wherein spacers 240c are positioned between press bases 210b and 210c to form a ring-like structure. Positioning of spacers 240c between press bases 210b and 210c may be accomplished as described above, such as by using indentations in press bases 210b and 210c for alignment and spacer securing pockets and securing means to secure spacers 240c to press bases 210b and 210c. It should also be noted that spacers 240a and 240c shown in FIG. 13 will be placed under compression as with other spacers described herein.

Figure 14:
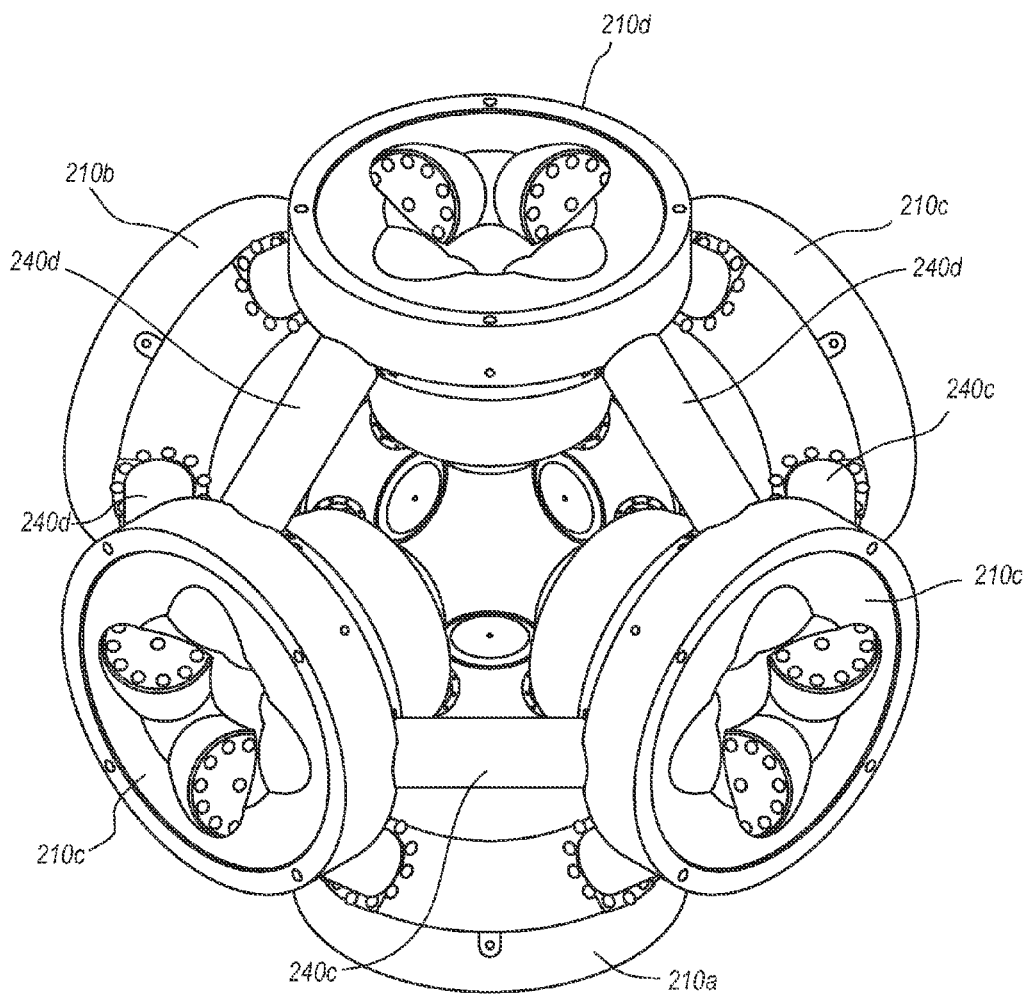
FIG. 14 shows a perspective view of a partially constructed high pressure press during an intermediate step of manufacturing a high pressure press according to an embodiment of the instant disclosure.

In order to complete the basic frame of the high pressure press, a press base 210d, which is identical to press base 210a illustrated in FIG. 10, may be positioned at the top of the high pressure press (referring to the orientation shown in FIGS. 10-14) as shown in FIG. 14. Press base 210d includes one or more spacers 240d which have been positioned relative to press base 210d, and possibly coupled thereto, prior to positioning press base 210d on the partially completed high pressure press frame. Spacers 240d may be positioned relative to press base 210d by using indentations on press base 210d and by using spacer securing pockets and securing mechanisms as described above.

Upon completion of the basic frame of the high pressure press as shown in FIG. 14, tie bars may be positioned between adjacent press bases as described in greater detail above. For example, press bases 210a, 210b, 210c, and 210d may each include tie bar cavities and tie bar pockets to enable tie bars to be coupled with adjacent press bases and placed under tension. Tensioning of tie bars may be accomplished by any suitable means. In one example, the tie bars are bolts having a capped end and a threaded end, and are tensioned by twisting a nut on to the threaded end of the tie bars to a specified level of torque. In another embodiment, the tie bars may include bolts that are placed in tension with a hydraulic pulling assembly and subsequently released after installation of a nut or other fastening component.

The method may include an additional act of tensioning the tie bars according to a predetermined order. For example, one tie bar (or another specified number of tie bars) between each adjacent pair of press bases may be tensioned before a additional tie bars between any adjacent pair of press bases may be tensioned. Alternatively, all of the tie bars between one adjacent pair of press bases may be tensioned before any other tie bars are tensioned. Additionally, the order of tensioning the tie bars about the periphery of a spacer may be prescribed. For example, the tie bars may be tensioned in a "star pattern" or some in some other predetermined pattern or order.

Figure 15:
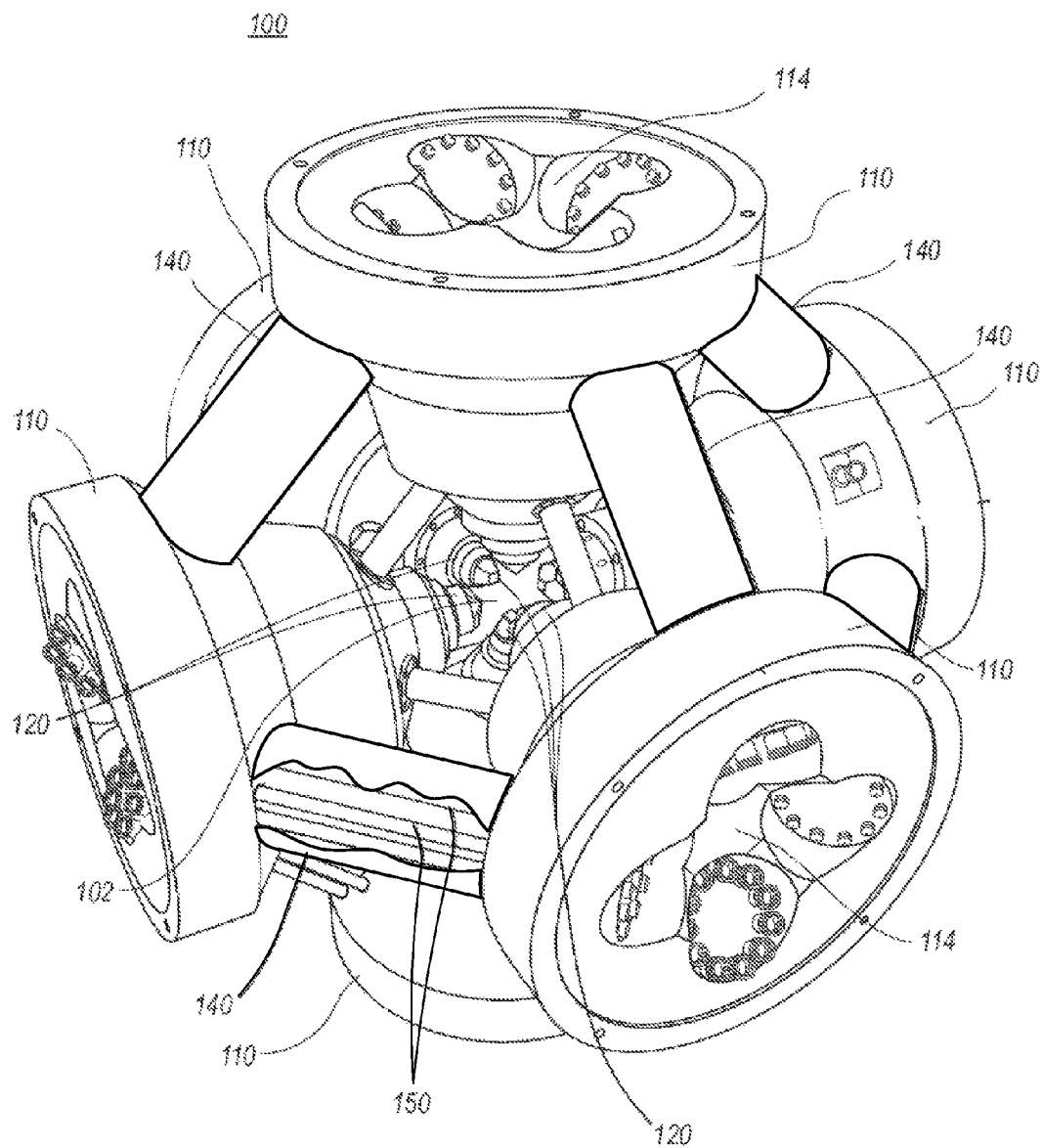
FIG. 15 shows a perspective view of a high pressure press according to another embodiment of the instant disclosure.

Referring briefly to FIG. 15, a press 100' is shown in accordance with another embodiment of the present invention. The press 100' is similar to that which has been describe above with respect, for example, to FIG. 3 and may include six press bases 110 configured in a cubic orientation with each press base 110 is positioned so that its central axis points at, and is perpendicular to, a different face of a cubic reaction cell located about a central region 102 of high pressure press 100 during operation. Press 100 also comprises six pistons 120, which may each be housed in a piston cavity 114 of an associated press base 110 and configured such has been described hereinabove.

In the embodiment described with respect to FIG. 15, a support structure may include a spacer 140' extending between each pair of adjacent press bases 110 and a set of two or more tie bars 150 extending between each pair of adjacent press bases 110. Spacer 140' may be configured as a generally tubular member, or as a body with a cavity extending therethrough. Tie bars 150 may be arranged about the internal periphery of spacer 140 (i.e., within the cavity) such that tie bars 150 are evenly spaced thereabout, although other uneven or geometrically asymmetrical spacing arrangements may also be used. In one embodiment tie bars 150 may be positioned such that they abut or are contiguous with the spacer 140'. In another embodiment, tie bars 150 may be set off from or spaced relative to the spacer 140' so that a gap exists between the sides of tie bars 150 and the internal periphery of spacer 140'. Also, tie bars 150 may be aligned to be substantially parallel with an internal surface of the spacer 140 as they extend between adjacent press bases 110.

It is noted that other components may be used in place of those shown and described regarding, for example, the spacers and tie bars. For example, tie bars may include any of a variety of tensile elements including, for example, cables or other structures relatively strong in tension.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A high pressure press comprising:
    six press bases positioned to provide a cubic press configuration, each press base including a piston displaceable towards a common central region;
    a plurality of spacers, each spacer extending between at least one press base of the six press bases and an adjacent press base of the six press bases; and
    a plurality of sets of tie bars, each set of tie bars including two or more tie bars extending between at least one press base of the six press bases and an adjacent press base of the six press bases, each set of tie bars being arranged adjacent a periphery of an associated spacer.

2. The high pressure press of claim 1, wherein the at least one spacer of the plurality of spacers is under compression and wherein each tie bar associated with the at least one spacer is under tension.

3. A high pressure press comprising:
    two or more press bases including pistons displaceable towards a common central region;
    a first spacer extending between a first press base and a second, adjacent press base of the two or more press bases, wherein the first spacer is bolted to at least one of the first press base and the second press base; and
    a first set of two or more tie bars extending between the first press base and the second press base and arranged adjacent a periphery of an associated spacer.

4. The high pressure press of claim 1, wherein each tie bar extends substantially parallel to its associated spacer.

5. The high pressure press of claim 1, wherein each spacer exhibits a substantially cylindrical shape.

6. The high pressure press of claim 5, wherein each set of two or more tie bars is arranged about a circumference of its associated spacer.

7. The high pressure press of claim 5, wherein each tie bar exhibits a substantially cylindrical shape.

8. A high pressure comprising:
    two or more press bases including pistons displaceable towards a common central region;
    a first spacer extending between a first press base and a second, adjacent press base of the two or more press bases; and
    a first set of two or more tie bars extending between the first press base and the second press base and arranged adjacent a periphery of an associated spacer;
    wherein the first spacer has a cross-sectional area $A_S$, the first set of two or more tie bars has a combined cross-sectional area $A_T$, and the value of $A_S/A_T$ is greater than 0.5.

9. The high pressure press of claim 8, wherein the value of $A_S/A_T$ is greater than 5.0.

10. A high pressure press comprising:

two or more press bases including pistons displaceable towards a common central region;

a first spacer extending between a first press base and a second, adjacent press base of the two or more press bases, wherein a first end of the first spacer abuts an outer surface of the first press base and wherein a second end of the first spacer abuts an outer surface of the second press base; and a first set of two or more tie bars extending between the first press base and the second press base and arranged adjacent a periphery of an associated spacer.

11. The high pressure press of claim 10, wherein the outer surface of the first press base includes an indentation substantially conforming to the cross-sectional shape of the first spacer, wherein the outer surface of the second press base includes an indentation substantially conforming to the cross-sectional shape of the first spacer and wherein the first end of the first spacer is positioned generally within the indentation of the first press base and wherein the second end of the first spacer is positioned generally within the indentation of the second press base.

12. The high pressure press of claim 11, wherein the first end and the second end of the first spacer each include a notch configured to accommodate a wall of an associated indentation.

13. A high pressure press comprising:

two or more press bases including pistons displaceable towards a common central region;

a first spacer extending between a first press base and a second, adjacent press base of the two or more press bases; and a first set of two or more tie bars extending between the first press base and the second press base and arranged adjacent a periphery of an associated spacer;

wherein the first press base and the second press base each include tie bar receiving pockets that extend from an outer surface of its associated press base to another surface of its associated press base.

\* \* \* \* \*